United States Patent [19]

Broucke et al.

[11] Patent Number: 5,702,141
[45] Date of Patent: Dec. 30, 1997

[54] POLYBLOCK RAILWAY WHEEL

[75] Inventors: Jacques Broucke, Coudekerque; Francois DeMilly, Dunkerque, both of France

[73] Assignee: Valdunes, Puteaux, France

[21] Appl. No.: 653,587

[22] Filed: May 24, 1996

[30] Foreign Application Priority Data

May 30, 1995 [FR] France ................ 95 06330

[51] Int. Cl.⁶ .................................. B60B 17/00
[52] U.S. Cl. .................................. 295/7; 295/11
[58] Field of Search .................. 295/1, 7, 11, 21, 295/24, 35

[56] References Cited

U.S. PATENT DOCUMENTS

| | | | |
|---|---|---|---|
| 2,911,252 | 11/1959 | Templeton | 295/11 |
| 2,923,570 | 2/1960 | Jorn et al. | 295/7 |
| 4,458,966 | 7/1984 | Stensson et al. | 295/7 |
| 4,635,990 | 1/1987 | Golubenko et al. | 295/11 |
| 5,527,079 | 6/1996 | Catot et al. | 295/7 |

FOREIGN PATENT DOCUMENTS

| | | |
|---|---|---|
| 0 034 911 | 9/1981 | European Pat. Off. |
| 0 489 455 | 6/1992 | European Pat. Off. |
| 1 126 819 | 12/1956 | France |
| 14 55 130 | 5/1969 | Germany |
| 43 00 553 | 7/1994 | Germany |

*Primary Examiner*—Mark T. Le
*Attorney, Agent, or Firm*—Oblon, Spivak, McClelland, Maier & Neustadt, P.C.

[57] ABSTRACT

Polyblock railway wheel of the type comprising a rim (1), a center part (2) constituted by a hub (22) and a web (6), a damper (5) disposed between the center part (2) and the rim (1), at least one flange (3), and fasteners (7) for fixing the at least one flange (3). The rim (1) comprises in its inner part (9) two connection fillets (10,11) located on opposite sides of the plane of symmetry of the wheel and interconnected in their innermost part, by a generally flat annular strip (12). The damper (5) has a tulip-shaped section. It comprises two rings (19,20) each formed by a ring of elastic polymer material inserted between and bonded to an upper metal flank (31) and a lower metal flank (32); the upper metal flank (31) cooperating with the innermost part (9) of the rim (1), and the lower metal flank (32) cooperating with a flange (3,4).

7 Claims, 2 Drawing Sheets

POLYBLOCK RAILWAY WHEEL

BACKGROUND OF THE INVENTION

The present invention relates to a polyblock railway wheel comprising a rim, a centre part, and a damper disposed between the centre part and the rim.

DISCUSSION OF THE BACKGROUND

Polyblock railway wheels are well known. They are employed in particular in tramways for town transportation in order to limit the noise produced by the rolling of the wheels along the rails.

For example, a wheel of this type is known in which the damper is formed by two rings of rubber disposed one against the other between the centre part of the wheel and the rim and forming a very open V. However, with such an arrangement, it is not possible to conveniently adjust the dynamic behavior of the wheel in the axial direction, i.e. in the direction parallel to the axis of the wheel.

Also known is a wheel in which the damper is formed by a plurality of rubber blocks disposed on the circumference of the centre part of the wheel between the centre part of the wheel and the rim. However, a wheel of this type is rather complicated and expensive to manufacture. Further, and this is the main drawback, the rubber blocks only provide the wheel with a low axial stiffness, which results in an axial instability in operation.

European patent application No 0 489 455 discloses a polyblock wheel in which the damper is a ring of rubber comprising two lips which form with the axis of the wheel an angle of about 60°, the ring of rubber not completely filling the space between the centre part of the wheel and the rim. Such a wheel has a good elasticity in the axial direction but it is difficult to adjust simultaneously its elasticity in the axial direction and its elasticity in the radial direction so as to optimize its phonic behavior.

In these three wheels, the rubber is in direct contact with the metal of the wheel so that, by the effect of the stresses, the damper is deformed by creep. These deformations modify the dynamic characteristics of the damper and impair its efficiency.

Lastly, in all these wheels, it is necessary to separately forge the centre part and the rim, which complicates manufacture.

SUMMARY OF THE INVENTION

An object of the present invention is to overcome these drawbacks by proposing a polyblock railway wheel which is convenient to manufacture and in which the axial and radial dynamic behavior is optimized and the damping properties have good stability in service.

The invention therefore provides a polyblock railway wheel of the type comprising an annual rim, a centre, a damper disposed between the centre part and the rim, at least one flange and means for fixing the at least one flange, characterized in that the rim comprises in its inner part, disposed in facing relation to the axis of the wheel, two connection fillets located on opposite sides of the plane of symmetry of the wheel and connected, in their innermost part, by an annular generally flat strip, the damper has a tulip-shaped section, and the damper is constituted by two rings of an elastic polymer material each held between an upper metal ring and a lower metal ring which are adherent to the polymer material, the upper metal ring cooperating with one of the connecting fillets and the annular strip of the innermost part of the rim, the lower metal ring cooperating with a flange.

Preferably, the polyblock railway wheel comprises two flanges which hold the damper, are maintained by a plurality of bolts extending through the centre part of the wheel and ensure the clamping of the two flanges against the damper.

In order to reduce screeching noises, the wheel may further comprise a ring disposed in an annular groove in the rim.

To minimize the screeching noises, preferably the weight of the rim must be under 110 Kg, the radial dynamic rigidity of the wheel must be between $6\times10^8$ and $16\times10^8$ N/m and the axial dynamic rigidity of the wheel must be between $3\times10^8$ and $8\times10^8$ N/m.

In order to minimize the transmission of vibrations from the track to the axle, the weight of the rim must be under 110 Kg, the radial dynamic rigidity of the wheel must be lower than $1\times10^8$ N/m, the axial dynamic rigidity must be higher than $1\times10^8$ N/m and the axial static rigidity of the wheel must be higher than $0.5\times10^8$ N/m.

The invention also provides a process for manufacturing the rim and the centre part of a polyblock railway wheel, comprising:

manufacturing, by forging from a bloom of steel, a monoblock wheel comprising a centre part constituted by a hub and a web, and a rim connected to the web by connecting fillets having a radius comparable to half the thickness of the rim, separating the rim from the centre part, for example by punching along the line of connection between the web and the connecting fillets, machining the rim and the centre part.

BRIEF DESCRIPTION OF THE DRAWINGS

The invention will now be described in a more precise but non limitative manner, with reference to the accompanying drawings in which.

DESCRIPTION OF THE PREFERRED EMBODIMENTS

Figure 1:
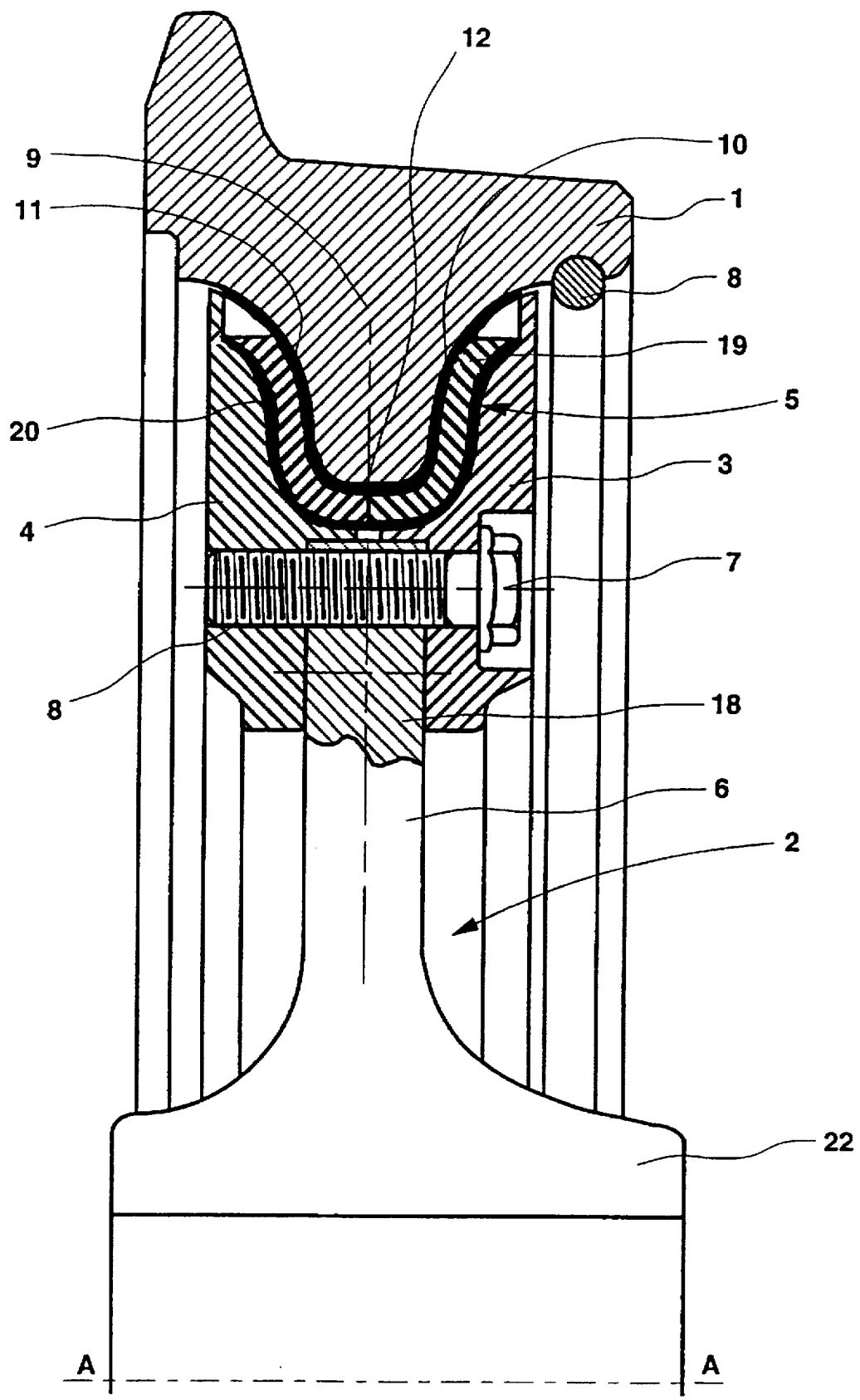
FIG. 1 is a half radial sectional view of a polyblock railway wheel.
Figure 2:
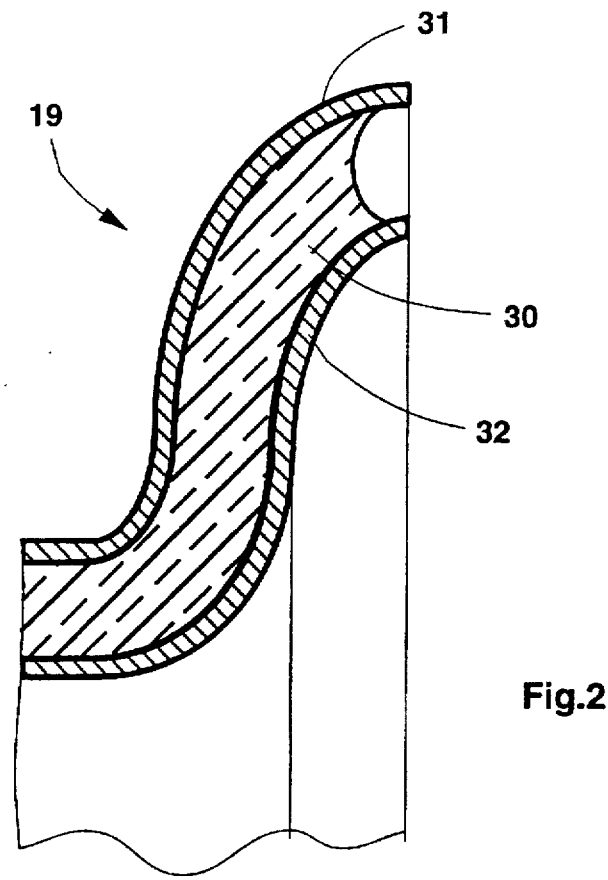
FIG. 2 is a view to a larger scale of the section of a damping ring.
Figure 3:
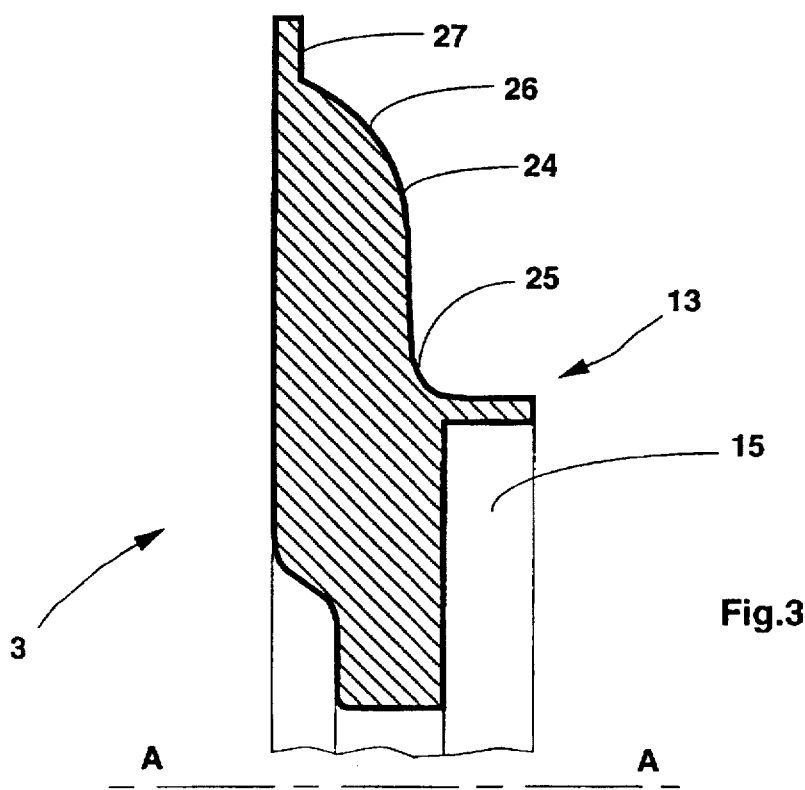
FIG. 3 is a half radial sectional view of a flange.

The polyblock railway wheel according to the invention is an assembly of parts of revolution which comprises a rim 1, a monoblock centre part 2 constituted by a hub 2 and a web 6, two flanges 3 and 4 fitted on the periphery of the web 6, and a damper 5 disposed between, on one hand, the flanges 3 and 4 and, on the other hand, the rim 1. The flanges 3 and 4 are disposed in facing relation to each other on opposite sides of the web 6 of the centre part 2, and are maintained clamped against the web 6 by a plurality of bolts 7 which extend through one flange 3 and the web 6, and are screwed in a plurality of tapped holes in the other flange 4. The bolts 7 are arranged along a circular line around the axis AA of revolution of the wheel. As shown in FIG. 1, the wheel may further comprise a ring 8 for reducing screeching noises.

The innermost part 9 of the rim 1, i.e. the part which is the closest to the axis AA of revolution, comprises two connection fillets 10 and 11 having a radius comparable to one half of the thickness of the rim, disposed in facing relation to each other, and interconnected by a cylindrical roughly flat strip 12 so that, in cross section, the innermost part 9 of the rim has a shape of a tulip disposed radially relative to the axis AA of the wheel and divergent outwardly of the wheel.

Each flange 3 or 4 comprises on a side 13, adapted to cooperate with the web 6 of the wheel in the part thereof which is the closest to the axis of revolution, an annular recess 15 which has a shape complementary to one half of the thickness of the radially outer end 18 of the web 6 and is adapted to be fitted on said end of the web. The part of the side 13 which is the most remote from the axis of revolution comprises a moulding 24 including a fillet 25, a rounded portion 26 and a flat portion 27 so that, when two flanges are mounted on the wheel in facing relation to each other, they form a tulip-shaped groove which provides between the flanges 3 and 4, on one hand, and the rim 1, on the other, an annular space in which the damper 5 is placed. The recesses 15 have a depth in the axial direction which is slightly less than one half of the thickness of the end 18 of the web 6 so that, when the two flanges are mounted they bear against the web without cooperating with each other.

The damper 5 comprises two interconnected identical rings 19 and 20. Each ring 19 or 20 comprises a core 30 of an elastic polymer material which is inserted between and adheres to two flanks 31 and 32 of sheet material such as sheet metal. The flank 31 is so shaped as to be able to cooperate with the rim and the flank 32 is so shaped as to be able to cooperate with the moulding 24 of a flange 3 or 4. Preferably, the polymer material is rubber provided with fillers in order to adjust its rigidity.

The thickness of the damper 5 is slightly greater than the thickness of the space left free between the rim 1 and the flanges 3 and 4 so that the damper 5 is subjected to a clamping to the extent of around one millimeter when the flanges 3 and 4 have been mounted.

Arranged in this way, the wheel is very easy to mount and has the advantage of permitting an optimal adjustment of its axial and radial dynamic behavior in accordance with the desires of the user. For this purpose, it is sufficient to adjust the rigidity of the rubber constituting the damper or the height of the lips of the latter.

Indeed, it is possible to either minimize the noise produced by rolling along the rail, or minimize the vibrations produced by the rolling and transmitted to the axle, in particular when the axle is directly coupled to the motor.

The inventors have found that, in either case, it is necessary first of all that the weight of the rim be as low as possible and in any case under 110 Kg when it is new.

The inventors have also found that:

when it is desired to minimize the rolling noise, the radial dynamic rigidity must be between $6 \times 10^8$ and $16 \times 10^8$ N/m and the axial dynamic rigidity must be between $3 \times 10^8$ and $8 \times 10^8$ N/m;

when it is desired to minimize the transmission of vibration, the radial dynamic rigidity must be lower than $1 \times 10^8$ N/m and the axial dynamic rigidity must be higher than $1 \times 10^8$ N/m; preferably, the radial static stiffness must be between $0.3 \times 10^8$ and $0.5 \times 10^8$ N/m and the axial static stiffness must be higher than $0.5 \times 10^8$ N/m.

The fact that the damper is constituted by rings having a core of rubber inserted between and bonded to two flanks of sheet material or metal, very substantially improves the behavior of the wheel in service. Indeed, the sheet flanks to which the rubber adheres prevent the creep of the rubber under the effect of the stresses. A much better stability in service of the properties of the damper results.

Such a damper may be very easily manufactured by a direct moulding of the rubber between the sheet flanks. To ensure the adherence of the rubber, it is sufficient to prepare the surface of the flanks by sand or shot blasting.

The wheel according to an invention also has the advantage of the possibility of being manufactured more simply and at lower cost than the wheels of the prior art. Indeed, to manufacture the proposed wheels, it is possible to forge a monoblock wheel comprising a hub, a web and a rim connected to the web by connection fillets having a radius comparable to one half the thickness of the rim, then separate the wheel from the centre part constituted by the hub and the web, for example by punching along the junction line between the connection fillets and the web. It is then sufficient to effect a slight machining to eliminate the punching burrs.

In an alternative embodiment, the damper comprises two rubber bands of suitable length and section directly bonded to the rim by means of an adhesive. This method has the advantage of permitting the use of, not prefabicated rings adapted to each wheel diameter, but a band wound in a roll which is merely unwound and cut to length.

These polyblock wheels are particularly adapted to the equipment of urban or suburban railway transportation such as tramways, metros or subways. These wheels usually have a nominal diameter of between about 400 mm and about 920 mm.

What is claimed as new and desired to be secured by Letters Patent of the United States:

1. Polyblock railway wheel comprising:
   a rim having an inner portion including two connecting fillets on opposite sides of a plane of symmetry of said wheel and an annular generally flat strip portion interconnecting said two connecting fillets in an innermost part of said two connecting fillets;
   a centre part including a hub and web;
   at least one flange member;
   means for fixing said at least one flange member against said web; and
   weight of under 110 Kg, a radial dynamic rigidity between $6 \times 10^8$ and $16 \times 10^8$ N/m, and an axial dynamic rigidity between $3 \times 10^8$ and $8 \times 10^8$ N/m.

2. Wheel according to claim 1, comprising two of said flange members holding said damper, and a plurality of bolts which extend through said centre part of said wheel and clamp said two flange members against said damper.

3. Wheel according to claim 1, further comprising an annular groove in said rim and a ring mounted in said annular groove.

4. Wheel according to claim 1, wherein said rim has a
   a damper disposed between said centre part and said rim, having a tulip-shaped cross section including two ring structures, each ring structure including a ring of an elastic polymer material, an upper metal flank wall and a lower metal flank wall, said ring of an elastic polymer material being inserted between and bonded to said two metal flank walls, said upper metal flank wall being fitted against said inner portion of said rim, said lower metal flank wall being fitted against said at least one flange member, so that said damper is clamped between said rim and said at least one flange.

5. Wheel according to claim 2, wherein said rim has a weight of under 110 Kg, a radial dynamic rigidity between $6 \times 10^8$ and $16 \times 10^8$ N/m, and an axial dynamic rigidity between $3 \times 10^8$ and $8 \times 10^8$ N/m.

6. Wheel according to claim 1, wherein said rim has a weight of under 110 Kg, a radial dynamic rigidity lower than $1\times10^8$ N/m, an axial dynamic rigidity higher than $1\times10^8$ N/m, and an axial static stiffness higher than $0.5\times10^8$ N/m.

7. Wheel according to claim 2, wherein said rim has a weight of under 110 Kg, a radial dynamic rigidity lower than $1\times10^8$ N/m, an axial dynamic rigidity higher than $1\times10^8$ N/m, and an axial static stiffness higher than $0.5\times10^8$ N/m.

* * * * *

UNITED STATES PATENT AND TRADEMARK OFFICE
CERTIFICATE OF CORRECTION

PATENT NO. : 5,702,141

DATED : DECEMBER 30, 1997

INVENTOR(S): JACQUES BROUCKE ET AL

It is certified that an error appears in the above-identified patent and that said Letters Patent is hereby corrected as shown below:

Column 4, lines 30 - 42,

"1. Polyblock railway wheel comprising:
a rim having an inner portion including two connecting fillets on opposite sides of a plane of symmetry of said wheel and an annular generally flat strip portion interconnecting said two connecting fillets in an innermost part of said two connecting fillets;
a centre part including a hub and web;
at least one flange member;
means for fixing said at least one flange member against said web; and
weight of under 110 Kg, a radial dynamic rigidity between $6 \times 10^8$ and $16 \times 10^8$ N/m, and an axial dynamic rigidity between $3 \times 10^8$ and $8 \times 10^8$ N/m.", should read --1. Polyblock railway wheel comprising:
a rim having an inner portion including two connecting fillets on opposite sides of a plane of symmetry of said wheel and an annular generally flat strip portion interconnecting said two connecting fillets in an innermost part of said two connecting fillets;
a centre part including a hub and web;
at least one flange member;

UNITED STATES PATENT AND TRADEMARK OFFICE
CERTIFICATE OF CORRECTION

PATENT NO. : 5,702,141

DATED : DECEMBER 30, 1997

INVENTOR(S): JACQUES BROUCKE ET AL

It is certified that an error appears in the above-identified patent and that said Letters Patent is hereby corrected as shown below:

means for fixing said at least one flange member against said web; and a damper disposed between said centre part and said rim, having a tulip-shaped cross section including two ring structures, each ring structure including a ring of an elastic polymer material, an upper metal flank wall and a lower metal flank wall, said ring of an elastic polymer material being inserted between and bonded to said two metal flank walls, said upper metal flank wall being fitted against said inner portion of said rim, said lower metal flank wall being fitted against said at least one flange member, so that said damper is clamped between said rim and said at least one flange.--

Column 4, lines 50-61,

"4. Wheel according to claim 1, wherein said rim has a damper disposed between said centre part and said rim, having a tulip-shaped cross section including two ring structures, each ring structure including a ring of an elastic polymer material, an upper metal flank wall and a lower metal flank wall, said ring of an elastic polymer material being inserted between and bonded to said two metal flank walls, said upper metal flank wall being fitted against said inner portion of said rim, said lower metal flank wall being fitted against said at least one flange member, so that said damper is clamped between said rim and said at least one flange.", should read

UNITED STATES PATENT AND TRADEMARK OFFICE
CERTIFICATE OF CORRECTION

PATENT NO. : 5,702,141

DATED : DECEMBER 30, 1997

INVENTOR(S): JACQUES BROUCKE ET AL

It is certified that an error appears in the above-identified patent and that said Letters Patent is hereby corrected as shown below:

--4. Wheel according to claim 1, wherein said rim has a weight of under 110 Kg, a radial dynamic rigidity between $6 \times 10^8$ and $16 \times 10^8$ N/m, and an axial dynamic rigidity between $3 \times 10^8$ and $8 \times 10^8$ N/m.--

Signed and Sealed this

Twenty-sixth Day of December, 2000

Attest:

Q. TODD DICKINSON

*Attesting Officer*     *Director of Patents and Trademarks*